United States Patent
Chen et al.

(10) Patent No.: US 11,366,084 B2
(45) Date of Patent: Jun. 21, 2022

(54) ULTRASONIC FLAW DETECTOR TEST BLOCK

(71) Applicant: NANJING DEVELOP ADVANCED MANUFACTURING CO., LTD., Nanjing (CN)

(72) Inventors: Changhua Chen, Nanjing (CN); Li Zhang, Nanjing (CN); Hong Zhang, Nanjing (CN); Zhengmao Xu, Nanjing (CN); Zheng Dong, Nanjing (CN); Qingyong Chen, Nanjing (CN); Xiaolei Liu, Nanjing (CN); Yao Ha, Nanjing (CN)

(73) Assignee: NANJING DEVELOP ADVANCED MANUFACTURING CO., LTD., Nanjing (CN)

( * ) Notice: Subject to any disclaimer, the term of this patent is extended or adjusted under 35 U.S.C. 154(b) by 0 days.

(21) Appl. No.: 16/980,423

(22) PCT Filed: Oct. 9, 2018

(86) PCT No.: PCT/CN2018/109459
§ 371 (c)(1),
(2) Date: Sep. 14, 2020

(87) PCT Pub. No.: WO2020/062322
PCT Pub. Date: Apr. 2, 2020

(65) Prior Publication Data
US 2021/0003537 A1    Jan. 7, 2021

(30) Foreign Application Priority Data
Sep. 26, 2018    (CN) .......................... 201811121491.X

(51) Int. Cl.
*G01N 29/30*    (2006.01)

(52) U.S. Cl.
CPC .................................. *G01N 29/30* (2013.01)

(58) Field of Classification Search
CPC ...................................................... G01N 29/30
See application file for complete search history.

(56) References Cited

U.S. PATENT DOCUMENTS

| 3,933,026 A | 1/1976 | Ham et al. |
| 2018/0011064 A1 | 1/2018 | Furr |

FOREIGN PATENT DOCUMENTS

| CN | 103954695 A | 7/2014 |
| CN | 104297350 A | 1/2015 |

(Continued)

OTHER PUBLICATIONS

Non destructive testing-Practice for fabrication and control of steel reference blocks used in ultrasonic testing, Oct. 9, 2015, General Administration of Quality Supervision, Inspection and Quarantine of the People's Republic of China; Standardization Administration.

(Continued)

*Primary Examiner* — Randy W Gibson
*Assistant Examiner* — John M Royston
(74) *Attorney, Agent, or Firm* — Bayramoglu Law Offices LLC

(57) ABSTRACT

A dudou-shaped test block includes a testing structure, a first beam-path structure, and a second beam-path structure. A first arc-shaped groove and a second arc-shaped groove are provided on one side of the testing structure. The other side of the testing structure is a flat surface. The first beam-path structure and the second beam-path structure are both flat plates. A thickness of the first beam-path structure is less than a thickness of the second beam-path structure. The first beam-path structure and the second beam-path structure are both in contact with the flat surface and arranged parallel to the flat surface. The first arc-shaped groove is arranged (Continued)

corresponding to the first beam-path structure, and the second arc-shaped groove is arranged corresponding to the second beam-path structure.

9 Claims, 2 Drawing Sheets

(56) References Cited

FOREIGN PATENT DOCUMENTS

| | | | | |
|---|---|---|---|---|
| CN | 206038622 U | | 3/2017 | |
| CN | 106596721 A | | 4/2017 | |
| GB | 1566429 A | * | 4/1980 | ............... G01H 1/00 |
| KR | 20110032562 A | | 3/2011 | |

OTHER PUBLICATIONS

Standard Practice for Fabrication and Control of Metal, Other than Aluminum Reference Blocks Used in Ultrasonic Testing, 2013, pp. 1-7, Designation: E428-08.

* cited by examiner

ULTRASONIC FLAW DETECTOR TEST BLOCK

CROSS REFERENCE TO THE RELATED APPLICATIONS

This application is the national stage entry of International Application No. PCT/CN2018/109459, filed on Oct. 9, 2018, which is based upon and claims priority to Chinese Patent Application No. 201811121491.X, filed on Sep. 26, 2018, the entire contents of which are incorporated herein by reference.

TECHNICAL FIELD

The present invention relates to the field of precise positioning in ultrasonic flaw detection on an inner-hole surface of a concave forged piece or hollow forged piece, and in particular, to a dudou-shaped test block.

BACKGROUND

Currently, V1 (IIW1) boat-shaped test blocks and V2 (IIW2) horn-shaped test blocks are major standard test blocks for calibration of ultrasonic flaw detectors and probes. They are mainly used for checking horizontal linearity, vertical linearity, dynamic ranges, sensitivity margin, resolution and dead zones, as well as points of incidence, angles of refraction and the like of the probes, where the surfaces to be detected by the probes are flat surfaces. Dudou-shaped test blocks function basically the same as the boat-shaped test blocks or horn-shaped test blocks, but the surfaces to be detected by the probes are concave surfaces. The surfaces of workpieces are generally flat surfaces and curved surfaces. When flaw detection is to be performed on flat surfaces, the boat-shaped test blocks and horn-shaped test blocks are used for calibration of the instruments and the probes; while when flaw detection is to be performed on concave surfaces, no test blocks are available worldwide for calibration of the instruments and the probes.

There have been no standard test blocks for tuning worldwide to achieve precise positioning in ultrasonic circumferential angle-beam flaw detection on concave forged pieces. How to determine the angle, scanning speed, and zero point of detection on a concave forged piece becomes a major problem in the field of nondestructive testing. For the circumferential angle-beam flaw detection of the parts in oil and gas drilling and production equipment, an internationally adopted flaw detection method is mainly to draw a line between first peak values of reflection obtained at notches on the inner and outer diameters and establish a datum line of amplitude. However, precise positioning of flaws cannot be ensured, and the existing reference blocks are incompetent for calibration of angles, speeds, and zero points.

Therefore, a new reference block is needed to solve the above problems.

SUMMARY

Objective of the invention: the present invention is directed to provide a dudou-shaped test block capable of calibrating the angle, acoustic velocity, and zero point of inner-hole circumferential angle-beam detection on a concave forged piece, to solve the defect in the prior art that the reference blocks are incompetent for calibration of angles, scanning speeds, and zero points.

Technical solution: to solve the above technical problem, the dudou-shaped test block of the present invention adopts the following technical solution.

A dudou-shaped test block comprises a testing structure, a first beam-path structure, and a second beam-path structure. A first arc-shaped groove and a second arc-shaped groove are provided on one side of the testing structure. The other side of the testing structure is a flat surface. The first beam-path structure and the second beam-path structure are both flat plates. The thickness of the first beam-path structure is less than the thickness of the second beam-path structure. The first beam-path structure and the second beam-path structure are both in contact with the flat surface and arranged parallel thereto. The first arc-shaped groove is arranged corresponding to the first beam-path structure, and the second arc-shaped groove is arranged corresponding to the second beam-path structure.

Further, the first arc-shaped groove and the second arc-shaped groove are both ¼ arc-shaped grooves, which can be adopted to effectively reduce the size of the dudou-shaped test block.

Further, the side where the first arc-shaped groove is closest to the second arc-shaped groove is away from the flat surface, and the side where the first arc-shaped groove is farthest away from the second arc-shaped groove is close to the flat surface.

Further, the dudou-shaped test block also comprises a supporting structure which is a flat plate. The supporting structure and the first beam-path structure are arranged in parallel with a gap there-between. The total thickness of the first beam-path structure, the supporting structure, and the gap is equal to the thickness of the second beam-path structure. Such a design ensures that the flat surface of the supporting structure away from the testing structure is at the same level as the flat surface of the second beam-path structure away from the testing structure, thereby facilitating the placement of the dudou-shaped test block.

Further, the thickness of the gap is greater than or equal to 5 mm.

Further, the smallest distance between the first arc-shaped groove and the second arc-shaped groove is greater than or equal to 5 mm.

Further, the distance from the axis of the first arc-shaped groove to the flat surface is R1+a, and the distance from the axis of the second arc-shaped groove to the flat surface is R2+a, where R1 is the radius of the first arc-shaped groove, R2 is the radius of the second arc-shaped groove, R1=R2. Preferably, a=0.

Further, the thickness of the first beam-path structure is 30 mm±0.1 mm, and the thickness of the second beam-path structure is 60 mm±0.1 mm. Errors in measurement results caused by the influence of a near-field region can be effectively avoided. Generally, the maximum crystal size of an angle-beam probe is 13×13 $mm^2$, and the frequency of the probe is 2.5 MHz; therefore, $\lambda=C/f=3230\times10^3/2.5\times10^6=1.29$ mm. During angle-beam measurement of the probe, the beam path between the probe and a reflection hole must be greater than twice the length of the near-field region of the probe, to avoid errors in measurement results caused by the influence of the near-field region; therefore, $N \geq d^2/(4\times\lambda)=13^2/(4\times1.29)=32.8$ mm, which meets the requirement of minimizing errors in angle-beam measurement of the probe. The thickness of the second beam-path structure is 60 mm which is twice of 30 mm and thus meets the requirement of being greater than 2N.

Further, the two ends of the testing structure, the first beam-path structure, and the second beam-path structure are all flat surfaces, and each flat surface of the testing structure is provided with angular graduations which facilitate detection of an incident angle of an angle-beam probe.

Further, the testing structure, the first beam-path structure, and the second beam-path structure each have a length greater than 25 mm.

Further, one end of the testing structure is provided with angular graduations and chamfered by R2 mm, and the other end of the testing structure is chamfered by R1 mm.

Beneficial effects: The dudou-shaped test block of the present invention has a simple structure, and can be used for calibration of angles, acoustic velocities, and zero points of circumferential angle-beam detection on concave forged pieces. By using parameters of instruments and probes calibrated with the dudou-shaped reference block of the present invention, accurate calibration of the instruments is achieved, which facilitates ultrasonic flaw location and detection of the concave forged pieces.

DETAILED DESCRIPTION OF THE EMBODIMENTS

The present invention will be illustrated in detail below by embodiments with the accompanying drawings. However, the provided embodiments are not intended to limit the scope of the present invention, and the operation description of structures is not intended to limit the operating sequence of the structures. Any device with equivalent efficacies that is produced by component reassembled structures shall fall within the scope of the present invention.

Figure 1:
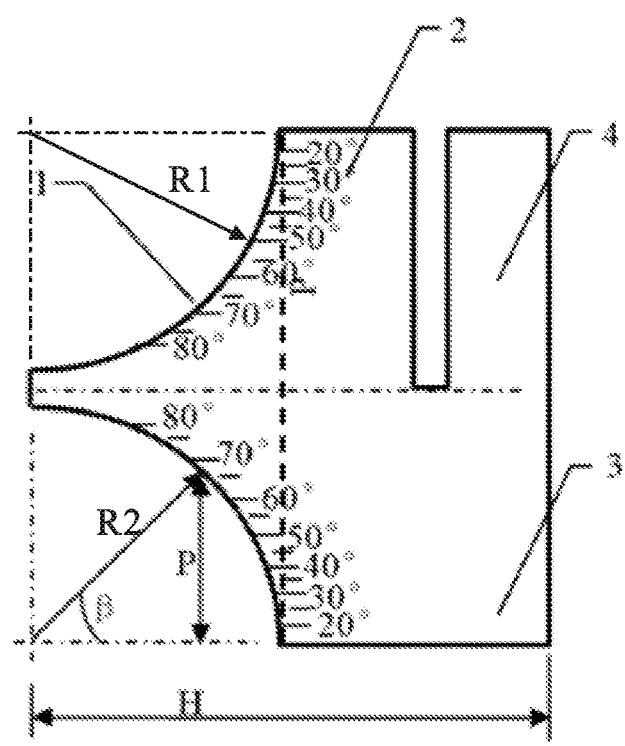
FIG. 1 is a front view of a dudou-shaped test block according to the present invention.
Figure 2:
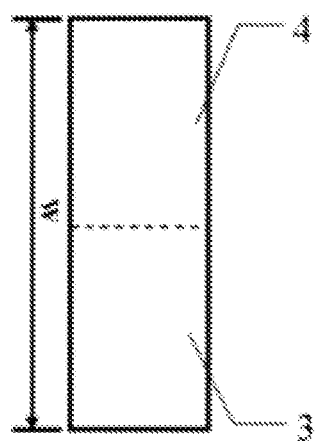
FIG. 2 is a left view of the dudou-shaped test block according to the present invention.

Referring to FIG. 1 and FIG. 2, the dudou-shaped test block of the present invention includes a testing structure 1, a first beam-path structure 2, and a second beam-path structure 3. A first arc-shaped groove and a second arc-shaped groove are provided on one side of the testing structure 1. The other side of the testing structure 1 is a flat surface. The first beam-path structure 2 and the second beam-path structure 3 are both flat plates. The thickness of the first beam-path structure 2 is less than the thickness of the second beam-path structure 3. The first beam-path structure 2 and the second beam-path structure 3 are both in contact with the flat surface and arranged parallel thereto. The first arc-shaped groove is arranged corresponding to the first beam-path structure 2, and the second arc-shaped groove is arranged corresponding to the second beam-path structure 2. Preferably, the first arc-shaped groove and the second arc-shaped groove are both ¼ arc-shaped grooves, which can be adopted to effectively reduce the size of the dudou-shaped test block.

Preferably, the side where the first arc-shaped groove is closest to the second arc-shaped groove is away from the flat surface, and the side where the first arc-shaped groove is farthest away from the second arc-shaped groove is close to the flat surface. Preferably, the smallest distance between the first arc-shaped groove and the second arc-shaped groove is greater than 5 mm.

Preferably, the dudou-shaped test block further includes a supporting structure 4 which is a flat plate. The supporting structure 4 and the first beam-path structure 2 are arranged in parallel with a gap there-between. The total thickness of the first beam-path structure 2, the supporting structure, and the gap is equal to the thickness of the second beam-path structure 3. Such a design ensures that the flat surface of the supporting structure away from the testing structure is at the same level as the flat surface of the second beam-path structure away from the testing structure, thereby facilitating the placement of the dudou-shaped test block. Preferably, the thickness of the gap is greater than 5 mm.

Preferably, the distance from the axis of the first arc-shaped groove to the flat surface is R1+a, and the distance from the axis of the second arc-shaped groove to the flat surface is R2+a, where R1 is the radius of the first arc-shaped groove, and R2 is the radius of the second arc-shaped groove. Preferably, a=0 in the present invention. Preferably, R1=R2.

Preferably, the two ends of the testing structure 1, the first beam-path structure 2, and the second beam-path structure 3 are all flat surfaces, and each flat surface of the testing structure 1 is provided with angular graduations which facilitate detection of an incident angle of an angle-beam probe. Preferably, the testing structure 1, the first beam-path structure 2, and the second beam-path structure 3 each have a length greater than or equal to 25 mm. Preferably, one end of the testing structure 1 is provided with angular graduations and chamfered by R2 mm, and the other end of the testing structure 1 is chamfered by R1 mm.

Explanations about Concepts in the Dudou-Shaped Test Block:

The thickness of the first beam-path structure 2 is the distance between the flat surface of the first beam-path structure 2 close to the testing structure 1 and the flat surface of the first beam-path structure 2 away from the testing structure 1. Each part of the first beam-path structure 2 has the same thickness.

The thickness of the second beam-path structure 3 is the distance between the flat surface of the second beam-path structure 3 close to the testing structure 1 and the flat surface of the second beam-path structure 3 away from the testing structure 1. Each part of the second beam-path structure 3 has the same thickness.

The thickness of the supporting structure 4 is the distance between the flat surface of the supporting structure 4 close to the first beam-path structure 2 and the flat surface of the supporting structure 4 away from the first beam-path structure 2.

The bottom part of the dudou-shaped test block is the flat surface of the second beam-path structure 3 away from the testing structure 1.

The top part of the dudou-shaped test block is the flat surface of the testing structure 1 away from the first beam-path structure 2 and the second beam-path structure 3. The side of the testing structure 1 away from the first beam-path structure 2 and the second beam-path structure 3 is of a planar structure. The flat surface on the top part of the dudou-shaped test block is parallel to the flat surface on the bottom part of the dudou-shaped test block.

The height of the dudou-shaped test block is the distance between the top part and the bottom part of the dudou-shaped test block.

The length of the testing structure 1 is the distance between the two ends of the testing structure 1, where the two ends of the testing structure 1 are both flat surfaces.

The length of the first beam-path structure 2 is the distance between the two ends of the first beam-path structure 2, where the two ends of the first beam-path structure 2 are both flat surfaces.

The length of the second beam-path structure 3 is the distance between the two ends of the second beam-path structure 3, where the two ends of the second beam-path structure 3 are both flat surfaces.

The testing structure 1, the first beam-path structure 2, and the second beam-path structure 3 have the same length.

The length of the dudou-shaped test block is the length of the testing structure 1.

The width of the first beam-path structure 2 is the distance between the flat surface of the first beam-path structure 2 away from the second beam-path structure 3 and the flat surface of the first beam-path structure 2 close to the second beam-path structure 3.

The width of the second beam-path structure 3 is the distance between the flat surface of the second beam-path structure 3 away from the first beam-path structure 2 and the flat surface of the second beam-path structure 3 close to the first beam-path structure 2.

The width of the dudou-shaped test block is the distance between the flat surface of the first beam-path structure 2 away from the second beam-path structure 3 and the flat surface of the second beam-path structure 3 away from the first beam-path structure 2.

The surface of the testing structure with angular graduations is chamfered by $R2=0.5\pm0.1$ mm, and the surface of the testing structure without angular graduations is chamfered by $R1=1\pm0.1$ mm. The degree of flatness of the flat surface of the first beam-path structure 2 away from the testing structure is less than 0.05 mm, and the degree of parallelism of the two opposite end surfaces of the first beam-path structure 2 is less than 0.05 mm. The degree of flatness of the flat surface of the second beam-path structure 3 away from the testing structure is less than 0.05 mm, and the degree of parallelism of the two opposite end surfaces of the second beam-path structure 3 is less than 0.05 mm.

The tolerance of the radius R of the first arc-shaped groove and the second arc-shaped groove in the testing structure is ±0.1 mm. The testing structure 1, the first beam-path structure 2, and the second beam-path structure 3 each have a length greater than or equal to 25 mm.

Preferably, the testing structure 1, the first beam-path structure 2, and the second beam-path structure 3 each have a length of $50\pm0.10$ mm.

Preferably, the thickness of the first beam-path structure 2 is 30 mm±0.1 mm, and the thickness of the second beam-path structure 3 is 60 mm±0.1 mm. Errors in measurement results caused by the influence of a near-field region can be effectively avoided. Generally, the maximum crystal size of an angle-beam probe is 13×13 mm², and the frequency of the probe is 2.5 MHz; therefore, $\lambda=C/f=3230\times10^3/2.5\times10^6=1.29$ mm. During angle-beam measurement of the probe, the beam path between the probe and a reflection hole must be greater than twice the length of the near-field region of the probe, to avoid errors in measurement results caused by the influence of the near-field region; therefore, $N\geq d^2/(4\times\lambda)=13^2/(4\times1.29)=32.8$ mm, which meets the requirement of minimizing errors in angle-beam measurement of the probe. The thickness of the second beam-path structure is 60 mm which is twice of 30 mm and thus meets the requirement of being greater than 2N.

The dudou-shaped test block of the present invention has a simple structure, and can be used for calibration of angles, acoustic velocities, and zero points of circumferential angle-beam detection on concave forged pieces. By using parameters of instruments and probes calibrated with the dudou-shaped reference block of the present invention, accurate calibration of the instruments is achieved, which facilitates ultrasonic flaw location and detection of the concave forged pieces.

Embodiment 1

The reference block for calibration of angles, acoustic velocities, and zero points of detection on concave forged pieces is referred to as a dudou-shaped test block. The dudou-shaped test block has a thickness of 2″ (50 mm), a width of 2R, and a height of R+60. The positions P of longer angular graduation marks on upper surfaces and/or lower surfaces of two ¼ inner cylinders are calculated by the formula: $P=R\times Sin(\beta)$, where $\beta$ is 20°, 30°, 40°, 50°, 60°, 70°, 80°. The positions P of shorter angular graduation marks are calculated in the same way as the longer angular graduation marks, where the shorter graduation marks respectively represent 25°, 35°, 45°, 55°, 65°, 75°. Parameters about the positions P of angular graduation marks are shown in Table 1.

TABLE 1

Fabrication parameters about positions of angular graduation marks on a semicircular side surface

| No. | Test Block Type | R (radius) | 20° P (position) | 30° P (position) | 40° P (position) | 50° P (position) | 60° P (position) | 70° P (position) | 80° P (position) |
|---|---|---|---|---|---|---|---|---|---|
| 1 | 4130-ACVZ-0197 CBB50 | 50 | 17.1 | 25 | 32.1 | 38.3 | 43.3 | 47.0 | 49.2 |
| 2 | 4130-ACVZ-0394 CBB100 | 100 | 34.2 | 50 | 64.3 | 76.6 | 86.6 | 94.0 | 98.5 |
| 3 | 4130-ACVZ-0591 CBB150 | 150 | 51.3 | 75 | 96.4 | 114.9 | 129.9 | 141.0 | 147.7 |
| 4 | 4130-ACVZ-0787 CBB200 | 200 | 68.4 | 100 | 128.6 | 153.2 | 173.2 | 187.9 | 197.0 |
| 5 | 4130-ACVZ-0984 CBB250 | 250 | 85.5 | 125 | 160.7 | 191.5 | 216.5 | 234.9 | 246.2 |
| 6 | 4130-ACVZ-1181 CBB300 | 300 | 102.6 | 150 | 192.8 | 229.8 | 259.8 | 281.9 | 295.4 |
| 7 | 4130-ACVZ-1378 CBB350 | 350 | 119.7 | 175 | 225.0 | 268.1 | 303.1 | 328.9 | 344.7 |
| 8 | 4130-ACVZ-1575 CBB400 | 400 | 136.8 | 200 | 257.1 | 306.4 | 346.4 | 375.9 | 393.9 |

Note:
the length is in mm.

The roughness Ra≤6.3 um, and the mill test report, forging processes, thermal treatment parameters, dimensional inspection records of machining and the like should be complete. Test block parameters are shown in Table 2.

TABLE 2

Parameters for fabricating reference blocks

| No. | Test Block Type | R (radius mm) | W (width mm) | H (height mm) |
|---|---|---|---|---|
| 1 | 4130-ACVZ-0197 CBB50 | 50 | 105 | 110 |
| 2 | 4130-ACVZ-0394 CBB100 | 100 | 205 | 160 |
| 3 | 4130-ACVZ-0591 CBB150 | 150 | 305 | 210 |
| 4 | 4130-ACVZ-0787 CBB200 | 200 | 405 | 260 |
| 5 | 4130-ACVZ-0984 CBB250 | 250 | 505 | 310 |
| 6 | 4130-ACVZ-1181 CBB300 | 300 | 605 | 360 |
| 7 | 4130-ACVZ-1378 CBB350 | 350 | 705 | 410 |
| 8 | 4130-ACVZ-1575 CBB400 | 400 | 805 | 460 |

Note:
fabrication requirements: R—radius with a tolerance of ±0.015" (0.38 mm); W—width with a tolerance of ±0.030" (0.76 mm); H—height with a tolerance of ±0.030" (0.76 mm); P—position line of angles with a tolerance of ±0.001" (0.25 mm); I—typical test block identification; 4130 = typical alloy grade; C = concave, A = angle, V = acoustic velocity, Z = zero point; 0118 = 01.18", metallic radius in 00.00"; CBB = dudou-shaped test block; three digits: 456 = outer radius of 456 mm.

Embodiment 2

The reference block for calibration of K values, acoustic velocities, and zero points of detection on concave forged pieces is referred to as a dudou-shaped test block. The dudou-shaped test block has a thickness of 25 mm, a width of 2R, and a height of R+60. The positions P of longer K-value graduation marks on a semicircular side surface are calculated by the formula: P=R×Sin(β), where K=Tan(β), that is, 0.4, 0.7, 1.0, 1.5, 2.0, 2.5, 3.0. The positions P of shorter K-value graduation marks are calculated in the same way as the longer K-value graduation marks, where the shorter K-value graduation marks respectively represent 0.55, 0.85, 1.25, 1.75, 2.25, 2.75. Parameters about the positions P of K-value graduation marks are shown in Table 3.

TABLE 3

Fabrication parameters about positions of K-value graduation marks on a semicircular side surface

| No. | Test Block Type | R (radius) | K0.4 P (position) | K0.7 P (position) | K1.0 P (position) | K1.5 P (position) | K2.0 P (position) | K2.5 P (position) | K3.0 P (position) |
|---|---|---|---|---|---|---|---|---|---|
| 1 | 45-CKVZ-0394 CBB100 | 100 | 37.1 | 57.3 | 70.7 | 83.2 | 89.4 | 92.9 | 94.9 |

Note:
the length is in mm.

The roughness Ra≤6.3 um, and the mill test report, forging processes, thermal treatment parameters, dimensional inspection records of machining and the like should be complete. Test block parameters are shown in Table 4.

TABLE 4

Parameters for fabricating reference blocks

| No. | Test Block Type | R (radius mm) | W (width mm) | H (height mm) |
|---|---|---|---|---|
| 1 | 4130-CKVZ-0197 CBB50 | 50 | 105 | 110 |
| 2 | 4130-CKVZ-0394 CBB100 | 100 | 205 | 160 |
| 3 | 4130-CKVZ-0591 CBB150 | 150 | 305 | 210 |
| 4 | 4130-CKVZ-0787 CBB200 | 200 | 405 | 260 |
| 5 | 4130-CKVZ-0984 CBB250 | 250 | 505 | 310 |
| 6 | 4130-CKVZ-1181 CBB300 | 300 | 605 | 360 |
| 7 | 4130-CKVZ-1378 CBB350 | 350 | 700 | 410 |
| 8 | 4130-CKVZ-1575 CBB400 | 400 | 805 | 460 |

Note:
fabrication requirements: R—radius with a tolerance of ±0.015" (0.38 mm); W—width with a tolerance of ±0.030" (0.76 mm); H—height with a tolerance of ±0.030" (0.76 mm); P—position line of K values with a tolerance of ±0.001" (0.25 mm); I—typical test block identification; 45 = typical metal grade; C = concave, K = tangent of angle, V = acoustic velocity, Z = zero point; 0118 = 01.18", metallic radius in 00.00"; CBB = dudou-shaped test block; three digits: 456 = outer radius of 456 mm.

Materials of the reference block: the technical indexes of the reference block should be in line with the requirements of GB/T 11259 and ASTM E428 standards.

The principle of the invention: To better ensure accurate horizontal, vertical, and beam-path location in ultrasonic circumferential angle-beam flaw detection on an inner-hole surface of a concave forged piece or hollow forged piece, a dudou-shaped test block is designed. By firstly calibrating the angle of a probe, calculating ultrasonic reflection beam paths $S1=30+R\times(1-\cos(\beta))$ and $S2=60+R\times(1-\cos(\beta))$, and further calibrating the speed and zero point of the probe, precise positioning in angle-beam detection on a concave forged piece is achieved.

The present invention significantly improves precise positioning in ultrasonic angle-beam flaw detection, greatly raises the level of ultrasonic circumferential angle-beam detection on a concave forged piece, can work together with a series of dudou-shaped test blocks with an arc radius difference of 50 mm, and can realize precise positioning in ultrasonic flaw detection against longitudinal flaws of a hollow forged piece. By using parameters of instruments and probes calibrated with the dudou-shaped reference block of the present invention, accurate calibration of the instruments is achieved, which facilitates ultrasonic flaw location and detection of the concave forged pieces.

Through precise positioning in ultrasonic circumferential angle-beam flaw detection, the positions of flaws in a concave forged piece can be effectively determined, which helps to decide whether to proceed or reject the workpiece in the manufacturing process, and fully realizes the potentials and advantages of the flaw detection method.

What is claimed is:

1. A test block, comprising a testing structure, a first beam-path structure, and a second beam-path structure, wherein a first arc-shaped groove and a second arc-shaped groove are provided on a first side of the testing structure, a second side of the testing structure is a first flat surface, the first beam-path structure and the second beam-path structure are a first flat plate and a second flat plate, a thickness of the first beam-path structure is less than a thickness of the second beam-path structure, the first beam-path structure and the second beam-path structure are both in contact with the flat surface and arranged parallel to the flat surface, the first arc-shaped groove is arranged corresponding to the first beam-path structure, and the second arc-shaped groove is arranged corresponding to the second beam-path structure, wherein a smallest distance between the first arc-shaped groove and the second arc-shaped groove is greater than 5 mm.

2. The test block according to claim 1, wherein the first arc-shaped groove and the second arc-shaped groove are both ¼ arc-shaped grooves.

3. The test block according to claim 2, wherein a first side where the first arc-shaped groove is closest to the second arc-shaped groove is away from the flat surface, and a second side where the first arc-shaped groove is farthest away from the second arc-shaped groove is close to the flat surface.

4. The block according to claim 1, further comprising a supporting structure, wherein the supporting structure is a third flat plate, the supporting structure and the first beam-path structure are arranged in parallel with a gap between the supporting structure and the first beam-path structure, and a total thickness of the first beam-path structure, the supporting structure, and the gap is equal to the thickness of the second beam-path structure.

5. The test block according to claim 1, wherein a distance from an axis of the first arc-shaped groove to the flat surface is R1+a, and a distance from an axis of the second arc-shaped groove to the flat surface is R2+a, where R1 is a radius of the first arc-shaped groove, and R2 is a radius of the second arc-shaped groove.

6. The test block according to claim 1, wherein the thickness of the first beam-path structure is 30 mm±0.1 mm, and the thickness of the second beam-path structure is 60 mm±0.1 mm.

7. The test block according to claim 1, wherein two ends of the testing structure, two ends of the first beam-path structure, and two ends of the second beam-path structure are all second flat surfaces, and each second flat surface of the testing structure is provided with angular graduations.

8. The test block according to claim 1, wherein the testing structure, the first beam-path structure, and the second beam-path structure each have a length greater than or equal to 25 mm.

9. The test block according to claim 1, wherein a first end of the testing structure is provided with angular graduations and chamfered by R2 mm, and a second end of the testing structure is chamfered by R1 mm, where R1 is a radius of the first arc-shaped groove, and R2 is a radius of the second arc-shaped groove.

* * * * *